United States Patent [19]

Okuzumi

[11] 3,962,193

[45] June 8, 1976

[54] PROCESS FOR PREPARING LINEAR POLYESTERS IN THE PRESENCE OF METALLIC AMINO COMPOUNDS

[75] Inventor: Yuzi Okuzumi, Akron, Ohio

[73] Assignee: The Goodyear Tire & Rubber Company, Akron, Ohio

[22] Filed: Dec. 27, 1971

[21] Appl. No.: 212,716

Related U.S. Application Data

[63] Continuation of Ser. No. 696,095, Jan. 8, 1968, abandoned.

[52] U.S. Cl. ............................................. 260/75 R

[51] Int. Cl.$^2$ ........................................ C08G 63/34
[58] Field of Search ................................. 260/75 R

*Primary Examiner*—Murray Tillman
*Assistant Examiner*—W. C. Danison, Jr.
*Attorney, Agent, or Firm*—F. W. Brunner; J. M. Wallace, Jr.

[57] ABSTRACT

An improved process for ester interchange reactions and for preparing polyesters by ester interchange and condensation reactions using organic nitrogen compounds of metals as catalysts.

2 Claims, No Drawings

PROCESS FOR PREPARING LINEAR POLYESTERS IN THE PRESENCE OF METALLIC AMINO COMPOUNDS

This application is a continuation of Ser. No. 696,095, filed Jan. 8, 1968, now abandoned.

This invention relates to an improved method for carrying out ester interchange reactions and for preparing synthetic linear polyester resins. More particularly, it relates to the preparation of filament and film-forming polyester resins by ester interchange and polycondensation reactions using organic nitrogen compounds of metals as catalysts.

The prior art discloses various linear condensation polyesters derived from dihydroxy compounds and dibasic acids such as terephthalic acid which are capable of being drawn into fibers showing by characteristic X-ray patterns orientation along the fiber axis. Many of these linear fiber and film-forming polyesters consist of terephthalic acid and polymethylene glycols of the series $HO(CH_2)_n OH$ where n is an integer of from 2 to 10. In the ester interchange and condensation polymerization reactions used in preparing such resins various materials such as litharge, lead compounds, titanium compounds, tin compounds, compounds of other metals, and organic amines have been used to catalyze the reactions. The polyesters resulting from these known processes have varying amounts of color in the polymer, due to undesirable reactions.

It is an object of this invention to provide an improved process for preparing highly polymeric polyesters from glycols and esters of organic dicarboxylic acids.

Another object of this invention is to provide new catalyst compounds which are particularly effective in promoting the ester interchange and condensation reactions used for the preparation of polyester resins from glycols and dicarboxylic acids.

A further object of this invention is to provide a catalyst which is soluble in ethylene glycol or dimethyl terephthalate and which will result in particularly rapid ester interchange reaction between glycols and dialkyl terephthalates.

Other objects will be apparent as the description of the invention proceeds.

In accordance with this invention, it has been found that organic nitrogen compounds of metals selected from the group consisting of (A) amine compounds of metals in which the nitrogen is linked directly to the metal and (B) organic nitrogen coordination compounds of metals in which the nitrogen atom of the organic nitrogen compound is attached to the metal through a coordination linkage are effective catalysts for ester interchange and condensation reactions and can be used for the preparation of polyester resins. The number of ligands attached to the metal by coordination bonds vary depending upon the kind of metal and the nature of the ligand. A variety of coordination complexes can be prepared within the limit of the maximum coordination number. It is well known by those skilled in this art that the number of coordination bonds formed in a compound vary with the nature of the metal, the oxidation state of the metal, the geometrical configuration and conformation of the ligand and the chemical nature of the ligand.

The following general formulas in which valence bonds are indicated by a dash (-) and coordination bonds are indicated by an arrow ( ), the head of the arrow directed to the recipient of electrons donated by nitrogen, illustrate the catalysts of this invention:

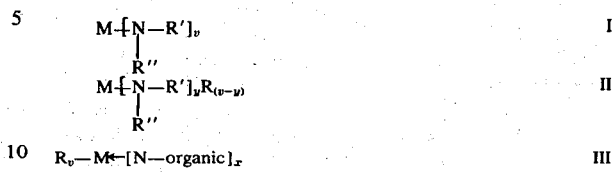

where M is a metal selected from group I to VIII of the Periodic Table; R is selected from alkyl radicals containing not more than 20 carbon atoms, aryl radicals, aralkyl radicals, alkaryl radicals, alicyclic radicals, an alkoxide, an aryloxide, and an anion of an organic acid bonded to the metal; R' and R'' are alkyl radicals containing not more than 20 carbon atoms, alkylene radicals containing not more than 20 carbon atoms, alkylyne radicals containing not more than 20 carbon atoms, aryl radicals, aralkyl radicals, alkaryl radicals, alicyclic radicals, arylene radicals and aralkylene radicals such that R' and R'' may join together to form ring compounds with nitrogen; N-organic is amines and heterocyclic compounds which contain at least one nitrogen and are capable of forming nitrogen metal bonds; v is the valence of the metal, x is a coordination number of the metal which is the number of coordination bonds formed between the metal and the ligand and y is an integer from 1 to (v-1).

Represenatative examples of the metals are metals such as Li, Na and K in group I; Ca, Sr, Ba, Mg, Zn and Cd in group II; La, La series, Th and U in group III; Ti, Zr, Sn and Pb in group IV; Nb, Ta, As, Sb and Bi in group V; Cr, Mo and W in group VI; Mn in group VII; Fe, Co and Ni in group VIII.

Representative examples of alkyl radicals containing not more than 20 carbon atoms are methyl, ethyl, propyl, butyl, amyl, hexyl, octadecanyl, nonadecanyl, and eicosanyl. Representative examples of aryl radicals are phenyl, naphthyl, and biphenyl. Representative examples of aralkyl radicals are benzyl, 2-phenyl ethyl and 3-phenyl propyl. Representative examples of alkaryl radicals are tolyl and p-ethyl phenyl. Representative examples of alicyclic radicals are cyclohexyl and cyclopentyl. Representative examples of an anion of an organic acid bonded to the metal are acetate, proprionate, lactate and oxalate. Representative examples of an alkoxide and an aryloxide are methyl, ethoxy, butoxy, phenoxy, naphthoxy, biphenoxy, and toloxy. Representative examples of alkylene radicals containing not more than 20 carbon atoms are methylene, ethylene and propylene, octadecanylene, nonadecanylene, and eicosanylene. Representative examples of alkylyne radicals containing not more than 20 carbon atoms are ethyne, propyne, butyne, octadecanyne nonadecanyne, and eicosanylene. Representative examples of arylene radicals are phenylene, naphthylene, and 4,4'-dipheny- lene. Representative examples of aralkylene radicals are 2-phenyl ethylene and 3-phenyl propylene.

Representative examples of N-organic are butylamine, diethylamine, tripropylamine, ethylenediamine, pyridine, piperazine, piperidine, and 2,2-bipyridine.

Representative examples of compounds of the invention are diethylamino lithium, bis-ethylene diamine copper, bis-dipropylamino magnesium, tris-butylamino lantanium, tetrakis-diethylamino uranium, tetrakis dipropylamino titanium, tetrakis-piperdino titanium, n- butylamino titanium diethylamide polymer, diethylamino zirconium, bis-diethylamino-diethyl tin, tetrakis-dibutylamino lead, pentakis-diethylamino-niobium, pentakis-diethylamino tantalum, tris-ethylene-diamine chromium, tris-2.2'-bipyridyl manganese, tris-2.2'-bipyridyl iron, tris-2.2'-bipyridyl cobalt, tris-2.2'-bipyridyl nickel, and other bipyridyl compounds of Na, K, Mg, Ca, Zn, Cd, La, La-series metals, Nd, Ga, In, As, Sb, Bi, Mo, W, Se, Te, Ru, Rh, Pd, Os, Ir, Pt, Th, and U. The preferred embodiments of this invention are the above catalysts as represented by the general formulas when M is a metal selected from groups I to VIII of the Periodic Chart, particularly where M is Li, Na, and K in group I; Mg, Ca, Zn, and Cd in group II; in La-series, Nd, Sm in group III; Ti, Ge, Sn, and Pb in group IV; Sb and Bi in group V; W in group VI; Mn in group VII; Co in group VIII. These compounds catalyze both the ester interchange reaction and subsequent polycondensation reactions. They can be used as the sole catalyst. However, if desired, a second catalyst can be used in combination with these compounds. Compounds of antimony, germanium, lead, titanium and tungsten are particularly effective as auxiliary catalysts, especially in the condensation or polymerization reaction. Such compounds include antimony trioxide, germanium oxide, litharge, titanium isopropylate and tungsten acetate.

The preparation of compounds illustrated by general formulae I to III can be accomplished according to the following exchange reactions:

(1) 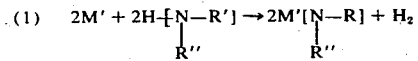

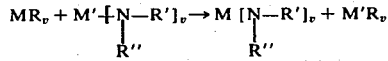

(2) 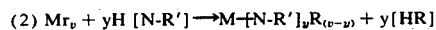

(3) 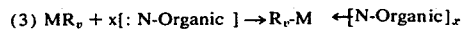

where M' is a different metal from that represented by M but included within the definition of M. Sometimes, it is advantageous to use the mixtures of above reaction products as catalyst (without isolating pure products), because the mixtures of products often provide rapid polymerization reactions as well as desirable qualities in the resulting polyesters.

The process of this invention involves the preparation of highly polymeric linear condensation polyesters from glycols, of the series $HO(CH_2)_nOH$ where n is an integer of from 2 to 10, and dialkyl esters of a dicarboxylic acid by ester interchange to form the glycol esters of the acid followed by the polymerization of the glycol diester of said carboxylic acid by heating at condensation temperatures with the elimination of glycol to form high molecular weight polyester, both ester interchange and condensation being carried out in the presence of a catalyst selected from the groups described above. The catalysts of this invention are organic nitrogen compounds of metals having nitrogen atoms bonded directly to the metal and coordination compounds in contrast to ionic salts.

In polyester resin used for the preparation of films or fibers, it is desirable to maintain the color of the polymer at a very low level. The color forming tendency is largely reduced by the use of the catalyst of this invention prepared from the combinations of one or more metal compounds selected from the group consisting of Li, Mg, Ca, La, La-series, Mn, Zn, Sn, Pb, and Sb.

In testing catalysts of the invention, ester interchange reactions were conducted by reacting dimethyl terephthalate and ethylene glycol at a temperature of 230°–280° C. under a nitrogen atmosphere and atmospheric pressure in the presence of the catalyst under agitation. The subsequent condensation polymerization was carried out at 240°–280° C. under reduced pressure of 0.01 to 0.5 millimeters of mercury pressure.

The following example will serve to illustrate the principle and practice of this invention.

EXAMPLE 1

Fifty grams of dimethyl terephthalate, 40 milliliters of ethylene glycol, 0.02 gram of Li $N(iC_3H_7)_2$ were charged into a reaction tube which was fitted with a stirrer, a nitrogen inlet tube and condenser. The mixture was stirred and heated to 240° C. and maintained at this temperature for two to three hours. Then while nitrogen gas was passed into the tube and over the reactants, 0.1 gram of $Sb_2O_3$ was added to the reaction mixture and polymerization was carried out at 280° C. and 0.5 millimeter of mercury pressure for two hours. A colorless polyester possessing an intrinsic viscosity of 0.693 was obtained.

EXAMPLES 2 to 9

The following table summarizes Examples 2 to 9 which were polymerized essentially as in Example 1 using the catalyst indicated in the amount of 0.02 grams:

| Example | Ester Interchange Catalyst | Intrinsic Viscosity |
|---|---|---|
| 2 | $Zn[N(iC_3H_7)_2]_2[CH_3COO]_2$ | 0.763 |
| 3 | $La[N(C_2H_5)_2]_3$ | 0.544 |
| 4 | $Ti[N(C_2H_5)_2]_4$ | 0.910 |
| 5 | $Nb[N(C_2H_5)_2]_5$ | 0.504 |
| 6 | Tris-bipyridyl chromium | 0.415 |
| 7 | Tris-ethylene diamine manganese | 0.672 |
| 8 | Tris-2,2'-bipyridyl cobalt | 0.834 |
| 9 | $Sn[N(C_2H_5)_2]_2[C_4H_9]_2$ | 0.492 |

EXAMPLE 10

A polyester was prepared according to the procedure of Example 1 using tetrakis-dipropylamino titanium as the condensation catalyst in place of $Sb_2O_3$. The resulting polyester was yellowish in color and possessed an intrinsic viscosity of 0.683.

A number of other amine complexes were tested for catalytic effect following the procedure indicated in Example 1. Physical properties of the polymeric polyethylene terephthalates obtained using the compounds of various metals as ester interchange catalysts are summarized in the following table.

Table 1

PHYSICAL PROPERTIES OF POLYESTERS OBTAINED BY ISOPROPYLAMINE METAL COMPOUNDS

| Periodic Group | Metal | I.V. | M.P. | Color |
|---|---|---|---|---|
| I | Li | .623 | 263 | Hazy White |
| II | Zn | .815 | 263 | Clear White |
| III | La | .554 | 264 | Clear White |
| IV | Ti | .970 | 264 | Yellow |
| V | Nb | .489 | 263 | Yellow |
| VI | Cr | .444 | 264 | Green |
| VII | Mn | .693 | 266 | Clear White |

Table 1-continued

PHYSICAL PROPERTIES OF POLYESTERS OBTAINED BY ISOPROPYLAMINE METAL COMPOUNDS

| Periodic Group | Metal | I.V. | M.P. | Color |
|---|---|---|---|---|
| VIII | Co | .894 | 263 | Pink-Blue |

I.V. — Intrinsic Viscosity
M.P. — Melting Point °C.
The intrinsic viscosity is defined as
$$\lim_{c \to 0} \frac{\ln(N_r)}{c}$$

as c approaches zero in which $N_r$ is the viscosity of a dilute solution of the resin in a 60/40 phenol/tetrochloroethane solvent mixture divided by the viscosity of the solvent mixture in the same units at the same temperature. For the intrinsic viscosities reported in this specification, a sufficient sample of each resin was dissolved in the solvent mixture to form a solution having a resin concentration of approximately 0.4 gram per 100 cubic centimeters of solution. The time of flow of each solution and of the solvent was measured in a No. 1 Ubbelohde Viscosimeter at 30.0° C. and these times were used in the respective viscosities in the equation above.

The amount of the catalyst used will ordinarily be very small. Usually the amount will be in the range of from 0.0001 to 0.1 percent by weight calculated as the metal, based on the weight of dicarboxylic acid esters used.

The practice of the invention has been illustrated with particular respect to the preparation of polymeric ethylene terephthalate. Polymeric ethylene isophthalate and copolyesters containing various ratios of ethylene terephthalate to ethylene isophthalate and other polyesters can similarly be made using the catalyst of the invention.

The examples illustrate the invention using the dimethyl esters of terephthalic acid and ethylene glycol. The invention is effective with other esters such as the ethyl, propyl, butyl and phenyl esters of the phthalic acids of other aromatic and aliphatic acids. Thus the catalyst combination can be used in the preparation of polyesters derived from other acids and/or other glycols. Representative examples of such other acids are aliphatic acids of the formula

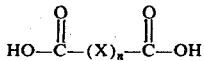

where X is an alkylene group and n is zero to ten, such as oxalic acid, malonic acid, succinic acid, glytaric acid, adipic acid, sebacic acid; suberic acid, etc.; methyl succinic acid, alpha methyl adipic acid; aromatic acids, such as the phthalic acids, p-hydroxyethoxy benzoic acid, the naphthalene dicarboxylic acids, the diphenyl dicarboxylic acids; and araliphatic acids such as alpha, betadiphenyl ethane-4,4'-dicarboxylic acid, alpha, beta-diphenyl butane4,4'-dicarboxylic acid. Representative examples of other glycols that can be used are trimethylene glycol, tetramethylene glycol, pentamethylene glycol, hexamethylene glycol, decamethylene glycol, alkyl substituted polymethylene glycols such as 2,2-dimethyl 1,3-propane diol, 2,2'-diethyl 1,3-propane diol, diethylene glycol, 2,2'-bis[4(-beta-hydroxyethoxy) phenyl] propane and cyclohexane dimethanol. The phthalic acids and ethylene glycol are preferred because of their low cast and ready availability. Thus, in a preferred embodiment, ethylene glycol is reacted with a bis ester of at least one acid selected from the group consisting of terephthalic acid and isophthalic acid and the resulting glycol ester or low polymer thereof condensed to form a high molecular weight linear polyester in the presence of the catalyst of the invention.

The highly polymeric linear condensation polyesters described herein are those whose intrinsic viscosity are at least 0.4 as measured in a 60/40 phenol/tetrachloroethane solution at 30° C.

While certain representative embodiments and details have been shown for the purpose of illustrating the invention, it will be apparent to those skilled in this art that various changes and modifications may be made therein without departing from the spirit or scope of the invention.

I claim:
1. In the process of preparing glycol esters of dicarboxylic acids by ester interchange reaction of an ester of said acid selected from the group consisting of methyl, ethyl, propyl, butyl and phenyl esters with a glycol followed by condensation with the elimination of glycol to form a high molecular weight polyester resin the improvement which comprises carrying out said ester interchange reaction in the presence of a catalytic amount of diisopropyl amino lithium.

2. In the process of preparing glycol esters of dicarboxylic acids by ester interchange reaction of an ester of said dicarboxylic acids selected from the group consisting of methyl, ethyl, propyl, butyl and phenyl esters with a glycol followed by the condensation polymerization of the glycol ester of the carboxylic acid by heating at condensation temperatures with elimination of glycol the improvement which comprises carrying out the ester interchange reaction in the presence of a catalytic amount of tetrakis(diethylamino titanium.

* * * * *

UNITED STATES PATENT AND TRADEMARK OFFICE
CERTIFICATE OF CORRECTION

PATENT NO. : 3,962,193
DATED : June 8, 1976
INVENTOR(S) : Yuzi Okuzumi

It is certified that error appears in the above–identified patent and that said Letters Patent are hereby corrected as shown below:

In Column 2, Line 49, "methyl" should be --methoxy--.

Signed and Sealed this

Third Day of July 1979

[SEAL]

Attest:

Attesting Officer

LUTRELLE F. PARKER
*Acting Commissioner of Patents and Trademarks*